(12) United States Patent
Lu

(10) Patent No.: US 12,532,949 B2
(45) Date of Patent: Jan. 27, 2026

(54) 2-PART COMPOSTABLE BIOPOLYMER CASE FOR MOBILE DEVICE

(71) Applicant: Valor Communication, Inc., City of Industry, CA (US)

(72) Inventor: Steven Lu, Diamond Bar, CA (US)

(73) Assignee: Valor Communication, Inc., City of Industry, CA (US)

( * ) Notice: Subject to any disclaimer, the term of this patent is extended or adjusted under 35 U.S.C. 154(b) by 563 days.

(21) Appl. No.: 18/060,392

(22) Filed: Nov. 30, 2022

(65) Prior Publication Data

US 2024/0172849 A1 May 30, 2024

(51) Int. Cl.
*A45C 11/00* (2006.01)

(52) U.S. Cl.
CPC ............. *A45C 11/00* (2013.01); *A45C 11/002* (2025.01)

(58) Field of Classification Search
CPC ............................... A45C 11/002; A45C 11/00
USPC ..................................................... 455/575.8
See application file for complete search history.

(56) References Cited

U.S. PATENT DOCUMENTS

| | | | |
|---|---|---|---|
| 9,768,822 B1 * | 9/2017 | Loh | H04B 1/3888 |
| 10,063,269 B2 * | 8/2018 | Smith | B32B 38/0008 |
| 10,292,285 B2 * | 5/2019 | Cavenagh | H05K 5/30 |
| 10,763,911 B1 * | 9/2020 | Lang | H04B 1/3888 |
| 10,848,194 B2 * | 11/2020 | Fathollahi | H04B 1/3888 |
| 10,868,996 B1 * | 12/2020 | Lang | A45C 11/00 |
| 2017/0170863 A1 * | 6/2017 | Liu | H04W 52/0254 |

* cited by examiner

*Primary Examiner* — Qutbuddin Ghulamali
(74) *Attorney, Agent, or Firm* — Shumaker & Sieffert, P.A.

(57) ABSTRACT

A protective case for a mobile device is disclosed. The protective case includes a substantially rigid outer shell and an inner case softer than the outer shell. Both the outer shell and the inner case are made of a compostable and/or biodegradable material. The outer shell includes a first planar back surface, first flanges positioned at least two peripheral edges of the planar back surface for securing the outer shell to the inner case, and open corners for exposing raised corners of the inner case. The inner case includes a second planar back surface, and second flanges around a periphery of the second back surface for securing the inner case to the mobile device. The raised corners are configured to protrude through the open corners of the outer shell.

7 Claims, 5 Drawing Sheets

2-PART COMPOSTABLE BIOPOLYMER CASE FOR MOBILE DEVICE

TECHNICAL FIELD

The technology discussed below relates generally to protective cases for electronic devices.

BACKGROUND

Protective covers or cases for mobile devices, such as mobile phones, are a common means for providing a mobile device with improved durability. A wide variety of protective cases is available, giving consumers a broad selection of factors to consider when making a purchase, including drop test resistance, decoration, and materials, to name but a few.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the present disclosure provides a protective case for a mobile device, such as a mobile phone. The protective case is constructed of compostable biopolymer material, such as polylactic acid (PLA). The protective case includes two main components: a substantially rigid outer shell and a soft inner case. The outer shell includes a first planar back surface, first flanges at peripheral edges of the planar back surface, and open corners. The open corners are configured for exposing raised corners of the inner case. The soft inner case includes a second planar back surface, second flanges around a periphery of the second back surface, and raised corners configured to protrude through the open corners of the hard outer shell. The raised corners of the soft inner case may include a hollow, such that the raised corners are configured to be separated from corners of the mobile device. The raised corners may further include a plurality of concave portions on an outer surface, for improving elasticity of the raised corners.

In some examples, the hard outer shell and the soft inner shell include a camera opening for exposing a camera of the mobile device. The camera opening in the hard outer shell may be larger than the camera opening in the soft case, such that a raised rim around an outer periphery of the camera opening in the soft inner case protrudes beyond the first planar back surface of the hard outer shell.

The hard outer shell may further include a discontinuity at a corner closest to the location of the camera opening. A plurality of fastening tabs (e.g., two tabs) at the discontinuity may fasten the outer shell to the inner case at the discontinuous corner.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Mobile device cases are commonly used not only to protect mobile devices from impacts, drops, and scratches, but for ornamental purposes. Due to their generally low cost, mobile device cases are often replaced. While a typical mobile device case is manufactured from a polycarbonate (PC) or thermoplastic polyurethane (TPU) material, disposal of PC or TPU materials can have an adverse environmental impact.

In various aspects, the present disclosure provides a mobile device case constructed using compostable and/or biodegradable materials, such as polylactic acid, or PLA. PLA is only one example of compostable and/or biodegradable materials that may be used within the scope of the present disclosure, and other examples, any suitable compostable and/or biodegradable materials may be used, such as polyhydroxy-alkanoate (PHA), poly 3-caprolactone (PCL), polyester (PBSA), and polyvinyl alcohol (PVA). While PLA is a well-known compostable biopolymer material, its structural properties are inferior to those of PC or TPU materials in some respects. For example, a hard PLA material (e.g., PLA-100 (HD)) provides structural rigidity to a mobile device case, but is relatively brittle and can crack when dropped. On the other hand, a soft PLA material (e.g., PLA-80 (HD)) provides durability and crack-resistance, but lacks the stiffness and rigidity to be securely held in place and to function as a suitable mobile device case. Therefore, in some aspects, the present disclosure combines a hard compostable biopolymer material with a soft compostable biopolymer material in a way that obtains the durability and crack-resistance of the soft material as well as the stiffness and rigidity of the hard material.

Figure 1:
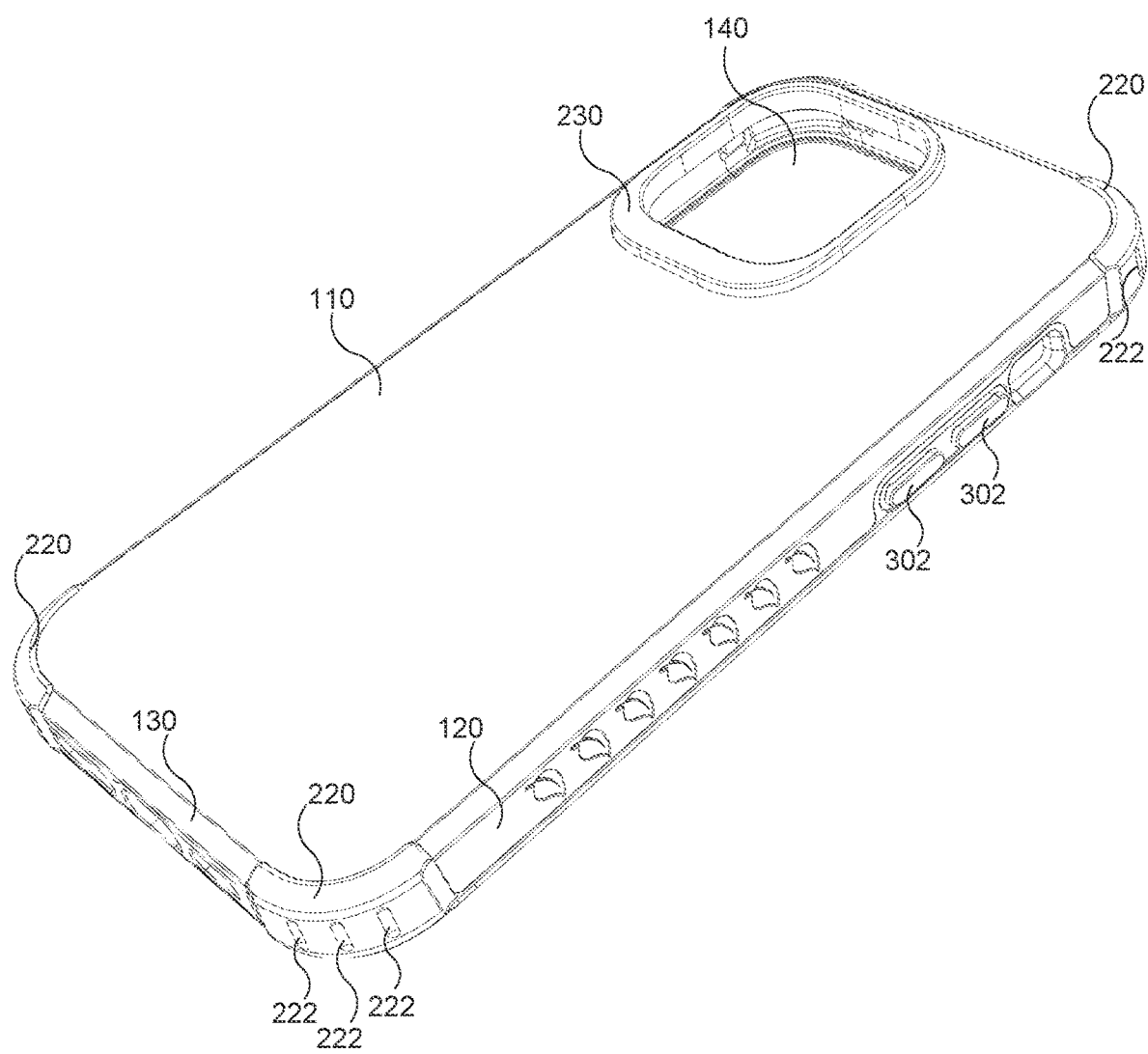
FIG. 1 is a plan view of an example mobile device case according to an aspect of this disclosure.

FIG. 1 is a plan view illustration of an example mobile phone case according to an aspect of this disclosure. In the illustration of FIG. 1, a hard shell 110 is coupled to a soft case 210 (see FIG. 3, described below) in a way that provides a drop-resistant compostable biopolymer mobile device case. The hard shell 110 generally wraps around the outer periphery of the soft portion 210, except at the four corners. At the corners, the hard shell 110 may have open corners for exposing raised corner portions 220 of the inner case 210.

Figure 2:
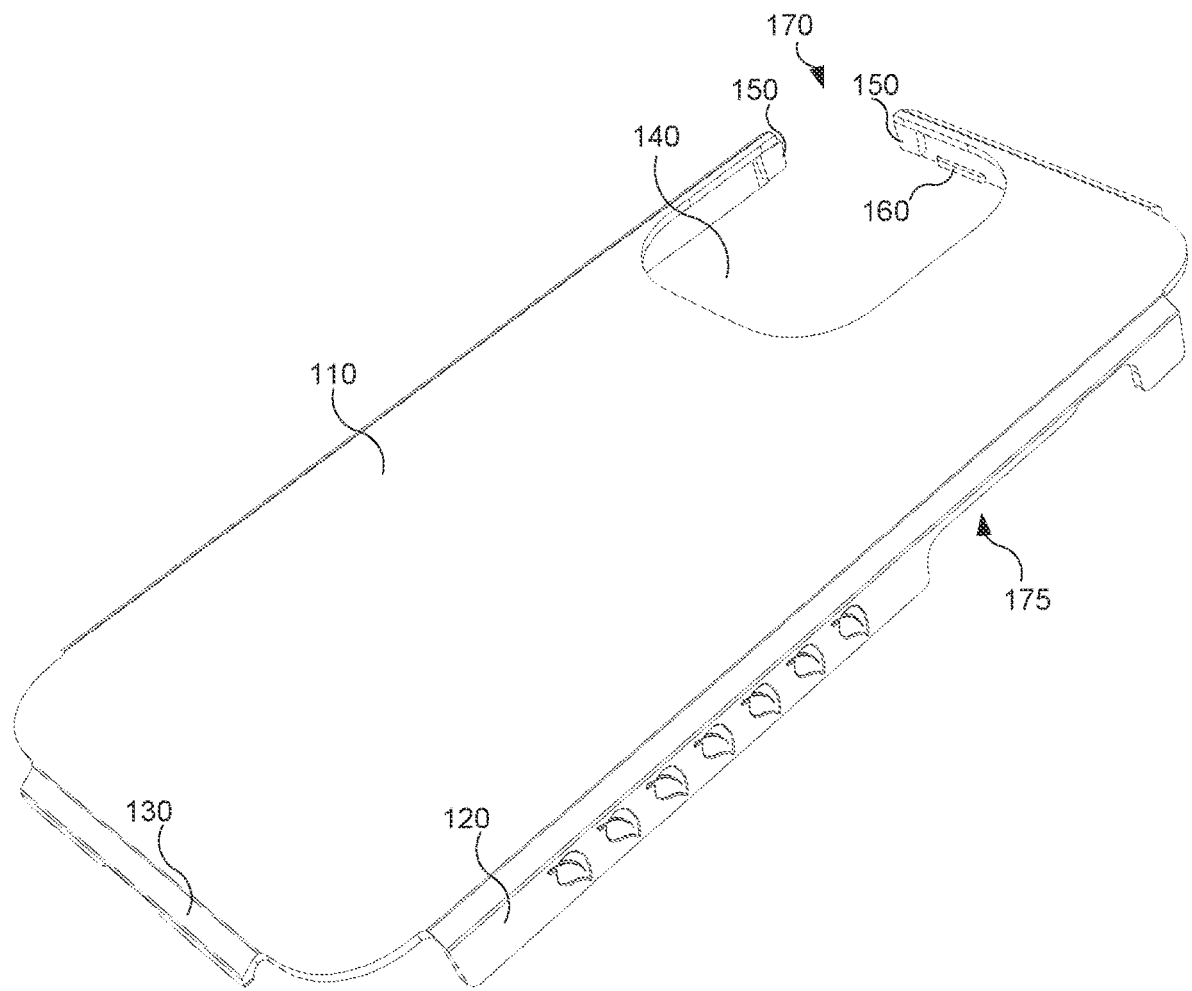
FIG. 2 is a plan view of an example hard shell component of a mobile device case according to an aspect of this disclosure.

FIG. 2 is a plan view illustration of an example hard shell 110 of a mobile device case according to an aspect of this disclosure. In the illustration of FIG. 2, the hard shell 110 is separated from the soft case 210 to show detail of the hard shell 110.

The hard shell 110 may be substantially rigid, e.g., being composed of PLA 100 (HD) shore hardness compostable biopolymer or other suitable rigid material. In some aspects, the hard shell 110 can provide improved durability and impact resistance to the encased mobile device. In addition, hard shell 110 can provide structural rigidity to a mobile device case constructed of compostable biopolymer material. The combination of a hard shell 110 with a soft inner case 210 provides for a sturdy, drop-resistant compostable and/or biodegradable protective case for a mobile device.

In the illustrated example, full-length flanges 120 are on three sides of the periphery of the hard shell 110, while a reduced-length flange 130 is used on one side of the periphery of the hard shell 110. The full-length flanges 120 and the reduced-length flange 130 can secure the hard shell 110 to the soft case 210. For example, as seen in FIGS. 2 and 4, the full-length flanges 120 and the reduced-length flange 130 each include one or more tabs 160 for securing the hard shell 110 to the soft case 210. That is, when the hard shell 110 is coupled to the soft case 210, tabs 160 mate with slots 250 (see FIG. 3) to fasten the hard shell 110 to the soft case 210.

In this example, the reduced-length flange 130 has a reduced length to accommodate a series of tightly-spaced interfaces at the corresponding side (e.g., speaker, microphone, I/O port, etc.). However, this is merely one example. Within the scope of this disclosure, full-length flanges 120 and reduced-length flanges 130 may be used at any side of a hard shell 110. In further examples, one or more of the flanges 120 and/or 130 may be omitted, although flanges may generally be positioned at at least two opposing peripheral edges of the back surface of the hard shell 110. In some examples, the hard outer shell 110 may further include openings 175 in one or more of the full-length flanges 120 to accommodate buttons and/or interfaces on the periphery of the mobile device.

As seen in FIG. 1, soft corners 220 are exposed when the soft case 210 is coupled to the hard shell 110. That is, the hard shell 110 includes openings at its corners for raised soft corners 220 to protrude. In this way, the hard shell 110, which may be more brittle than the soft case 210, can avoid impacts at the corners, which may cause cracking or breaking.

In some examples, the hard outer shell 110 may include a camera opening 140 for a camera on the back of the mobile device. In the illustrated example, the hard shell 110 includes a discontinuity or separation 170 at the corner closest to where camera window 140 is located. This discontinuity 170 is not necessarily included in all embodiments, but accommodates the illustrated implementation where the camera opening 140 is located close to the corner. In this example, tabs 150 at the corner with the discontinuity 170 fasten or secure the hard shell 110 to the protruding soft corner 220 by fitting inside mating holes 260 in the soft case (see FIG. 3).

Figure 3:
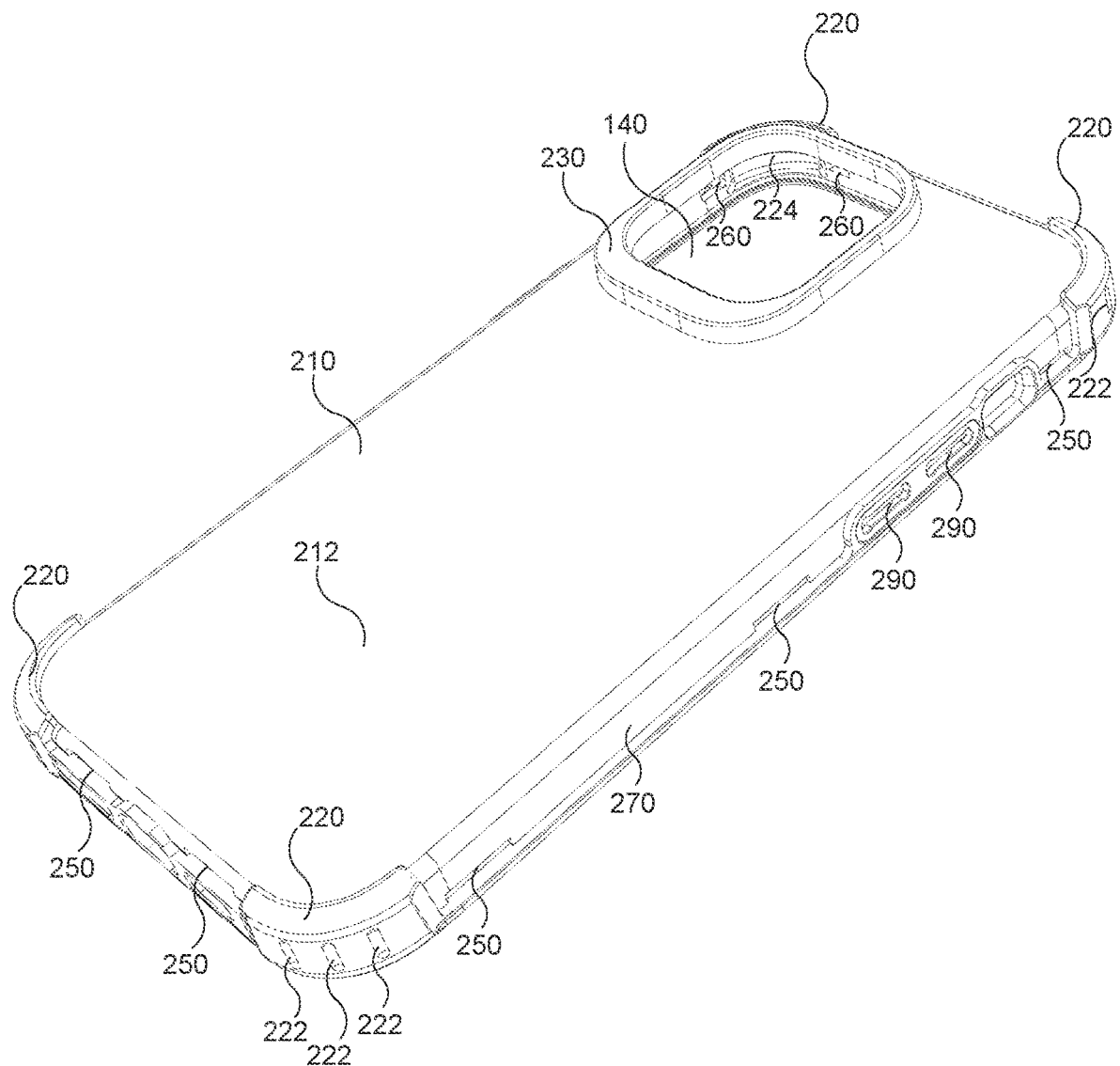
FIG. 3 is a plan view of an example soft case component of a mobile device case according to an aspect of this disclosure.
Figure 4:
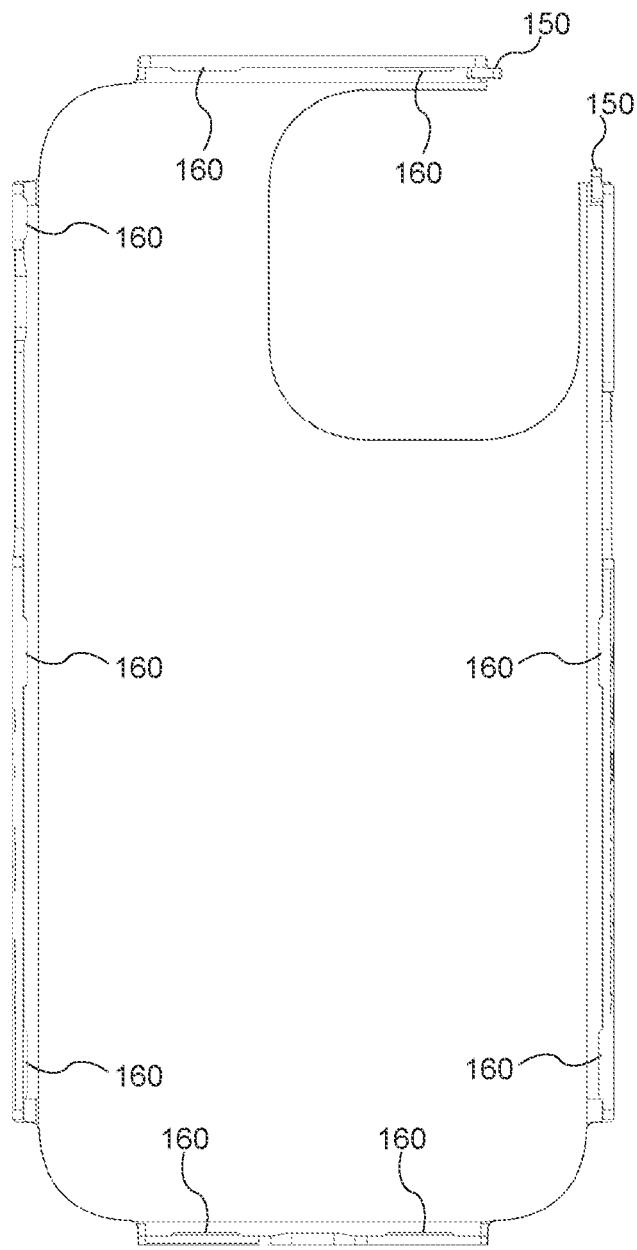
FIG. 4 is an inner side view of an example hard shell component of a mobile device case according to an aspect of this disclosure.

FIG. 3 is a plan view illustration of an example of a soft inner case 210 according to an aspect of the disclosure. In the illustration of FIG. 3, the soft case 210 is separated from the hard shell 110 to show detail of the soft case 210.

Soft inner case 210 may be made of a softer material than that of the hard outer shell 110, e.g., being made of PLA 80 (HD) shore hardness compostable biopolymer or other suitable material. The soft case 210 may be sized and shaped for a given mobile device to ensure that the case is secured to the mobile device while openings, buttons, screen, and interfaces on the mobile device can be used normally.

Aside from the camera hole 140, planar back surface 212 of the soft inner case 210 is illustrated as a continuous surface, although this is not necessarily the case. For example, the planar back surface 212 of the soft inner case 210 may have one or more holes.

Figure 5:
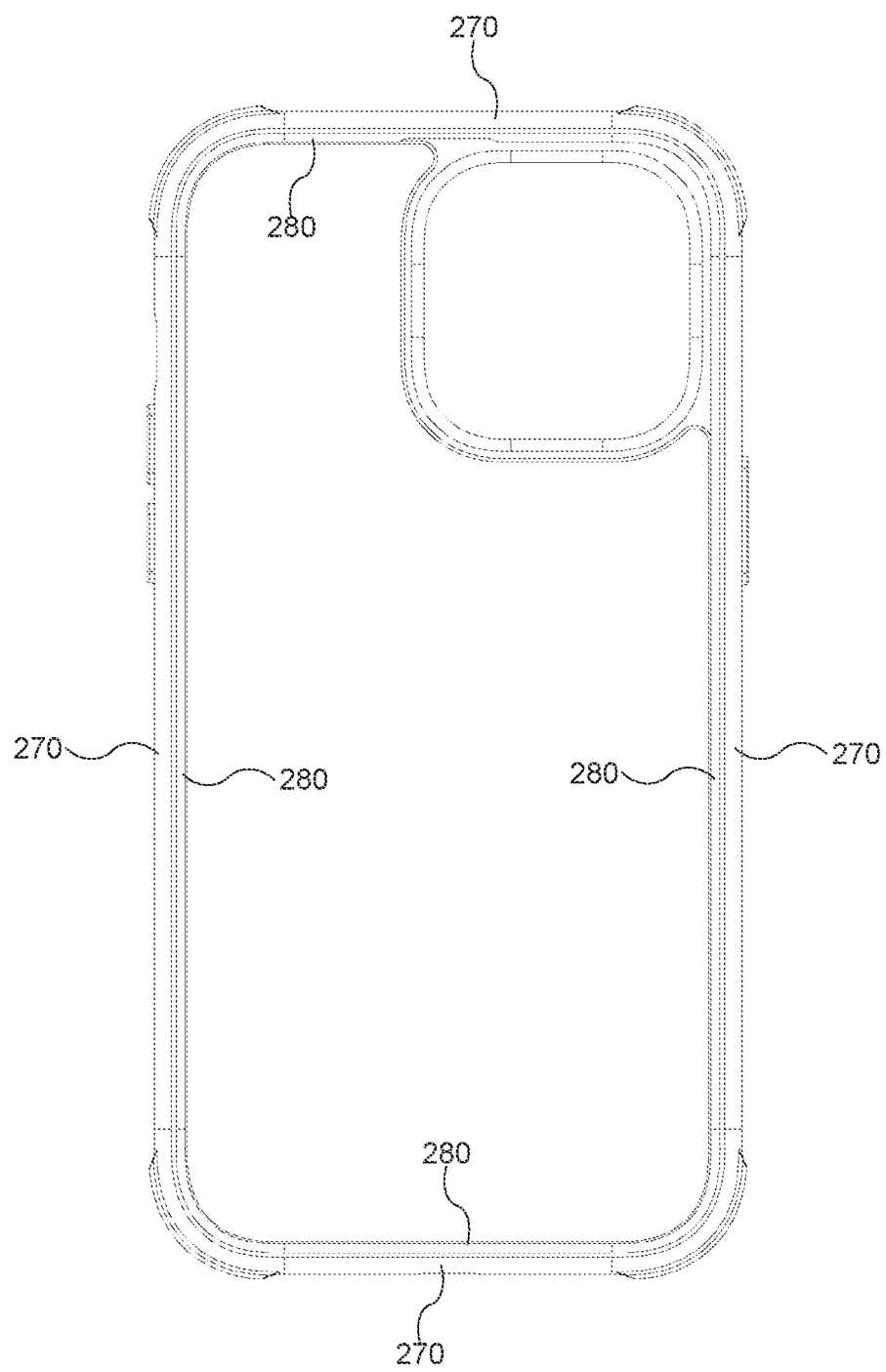
FIG. 5 is an inner side view of an example soft case component of a mobile device case according to an aspect of this disclosure.

In some aspects of this disclosure, the soft inner case 210 includes flanges 270 that wrap around the periphery of the mobile device including all peripheral sides and corners. In the illustrated example, the soft flanges 270 include openings for interfaces (buttons, switches, speakers, microphones, etc.), although these are optional. In a further aspect, seen in FIG. 5, the soft flanges 270 include inner flanges 280 around the interior periphery to secure the soft case 210 to the mobile device.

In a further aspect of the disclosure, the soft flanges 270 include button openings 290 where independently formed buttons 302 (see FIG. 1) may be inserted. That is, because the compostable and/or biodegradable material of the soft case 210 may have insufficient elasticity for comfortable use of integrally formed buttons, the buttons may be separately formed (e.g., of compostable material) and inserted into the button openings 290.

In a further aspect, the soft case 210 may include thickened, protruding corners 220 (e.g., corner bumpers) configured to protrude beyond the profile of the hard shell 110, as seen in FIG. 1. In some examples, a thicker material may be provided at the soft corners 220. In other examples, as illustrated in FIG. 3, the soft corners 220 may be raised above the periphery of the soft case 210, and structured to form a hollow 224 in the corners between the soft case 210 and the corners of the mobile device. Including the hollow 224 under the soft corners 220, separating the raised soft corners from the corners of the mobile device, can improve the elasticity of the compostable and/or biodegradable soft case 210 at the corners 220, and can improve drop resistance for an encased mobile device.

In a still further aspect, the soft corners 220 may include a plurality of concave portions 222 on an outer surface to further enhance the elasticity of the soft compostable material. These concave portions 222 can further improve drop resistance for an encased mobile device. In some examples, the concave portions may be constructed by thinning the material of the soft corners 220, while in other examples, the concave portions may protrude into the hollow underneath the raised corners.

By providing the raised soft corners 220, which protrude beyond the surface of the hard shell 110, a mobile device case can have satisfactory drop resistance without breaking easily. That is, the raised, protruding corners 220 can prevent the hard outer shell 110 from being directly impacted in a fall.

The soft case 210 may further include a camera rim 230 having a raised profile that protrudes outside hard outer shell 110 (see FIG. 1). The camera rim 230 may lie along the periphery of the camera hole 140.

By using a raised camera rim 230 that protrudes outside the hard outer shell 110, the soft case 320 can improve impact resistance of the encased mobile device when dropped. That is, the raised camera rim 230 is more likely to impact a surface than the hard shell 110. Using a soft camera rim 230 also reduces or avoids potential cracking at camera opening 140 that might otherwise occur if the hard shell 110 were exposed at the camera opening 140.

The raised camera rim 230 may further help secure the hard shell 110 to the soft inner case 210. That is, the camera opening 140 in the hard shell 110 may be larger than the camera opening in the soft case 210, being large enough to snugly fit the raised camera rim 230, reducing or avoiding potential movement between the soft case 210 and the hard shell 110. The soft camera rim 230 can additionally reduce the probability of thermal deformation occurring at the hard outer shell 110. Furthermore, the soft and dark color camera rim 230 can provide for improved light absorption around the mobile device's camera and can provide for improved aesthetics.

The soft case 210 may further include multiple slots 250 around the periphery of the soft case 210, configured to mate with tabs 160 in the hard outer shell 110, and to fasten the hard shell 110 to the soft case 210.

As mentioned above, the soft case 210 may further include mating holes 260 at the corner corresponding to the camera opening. These mating holes 260 are configured to mate with corner tabs 150 of the hard shell to secure the hard shell 110 to the soft case 210 at the corner 170 where the hard shell has a discontinuity in its structure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-5 may be rearranged and/or combined into a single component, step, feature or function or embodied in several components, steps, or functions. Additional elements, components, steps, and/or functions may also be added without departing from novel features disclosed herein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A protective case for a mobile device, comprising:
   a substantially rigid outer shell made of a first compostable material, the outer shell comprising:
      a first planar back surface;
      first flanges positioned around or at, at least two peripheral edges of the planar back surface for securing the outer shell to an inner case; and
      open corners for exposing raised corners of the inner case; and
   the inner case made of a second compostable material softer than the first compostable material, the inner case comprising:
      a second planar back surface;
      second flanges around a periphery of the second back surface for securing the inner case to the mobile device; and
      the raised corners of the inner case, configured to protrude through the open corners of the outer shell.

2. The protective case of claim 1, wherein the outer shell further comprises a first camera opening in the first planar back surface for exposing a camera of the mobile device, and wherein the inner case further comprises a second camera opening in the second planar back surface for exposing the camera of the mobile device.

3. The protective case of claim 2, wherein the outer shell further comprises:
   a discontinuity at a corner closest to a location of the first camera opening, and
   a plurality of fastening tabs at the discontinuity for fastening the outer shell to the inner case.

4. The protective case of claim 2, wherein the inner case further comprises a raised rim around an outer periphery of the second camera opening,
   wherein the first camera opening in the outer shell is larger than the second camera opening in the inner case such that the raised rim of the inner case is configured to protrude beyond the first planar back surface.

5. The protective case of claim 1, wherein the raised corners of the inner case each form a space between the inner case and the corners of the mobile device such that the raised corners are configured to be separated from corners of the mobile device.

6. The protective case of claim 1, wherein the raised corners of the inner case each comprise a plurality of concave portions on an outer surface of the raised corners.

7. The protective case of claim 1, wherein the first compostable material and the second compostable material are biodegradable materials.

* * * * *